United States Patent

[11] 3,572,592

| [72] | Inventor | Richard A. Jankowski |
| | | West Bend, Wis. |
| [21] | Appl. No. | 804,489 |
| [22] | Filed | Mar. 5, 1969 |
| [45] | Patented | Mar. 30, 1971 |
| [73] | Assignee | Kasten Manufacturing Corporation |
| | | Allenton, Wis. |

[54] DRIVE ARRANGEMENT
13 Claims, 4 Drawing Figs.

[52] U.S. Cl. ................................................. 239/680
[51] Int. Cl. .......................................... A01c 19/00, E01c 19/20
[50] Field of Search .................................. 239/680

[56] References Cited
UNITED STATES PATENTS

| 1,854,599 | 4/1932 | Oppenheim | 239/680 |
| 2,303,583 | 12/1942 | Sallee | 239/680X |
| 2,344,317 | 3/1944 | MacDonald | 239/680 |
| 2,674,460 | 4/1954 | Kincade | 239/680 |
| 2,769,641 | 11/1956 | Brown | 239/680 |
| 2,894,756 | 7/1959 | McDonough | 239/680X |
| 3,010,726 | 11/1961 | Smoker et al | 239/680X |

*Primary Examiner*—Lloyd L. King
*Attorney*—Wheeler, Wheeler, House and Clemency

ABSTRACT: Disclosed herein is a control assembly for a manure spreader having a beater drum driven by a clutch and an apron conveyor driven by a step by step ratchet drive, the assembly including a selectively positionable lever arm to control the motion of the ratchet drive, a clutch control rod connected to the lever arm and the clutch to disengage the clutch when the apron conveyor is operating at high speed, a kickout lever to prevent reengagement of the clutch when disengaged by the clutch control rod, and a cam on the lever arm to release the kickout lever from the clutch at the conveyor no drive position of the lever arm. The kickout lever is manually releasable from the clutch.

Patented March 30, 1971
3,572,592
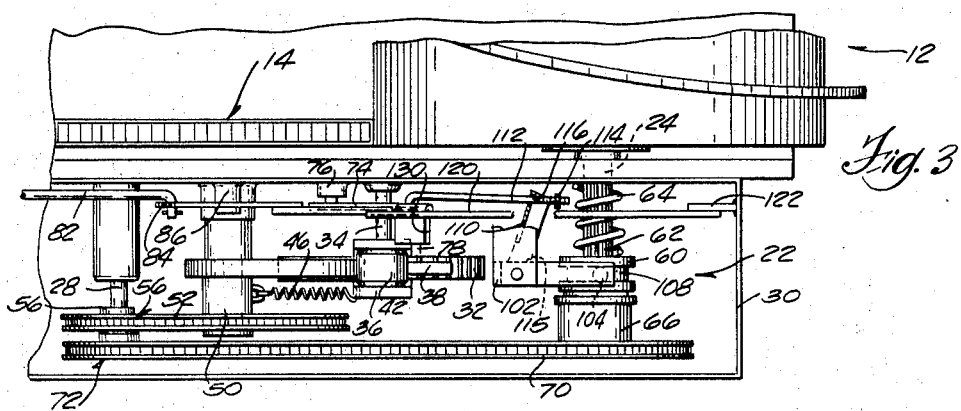
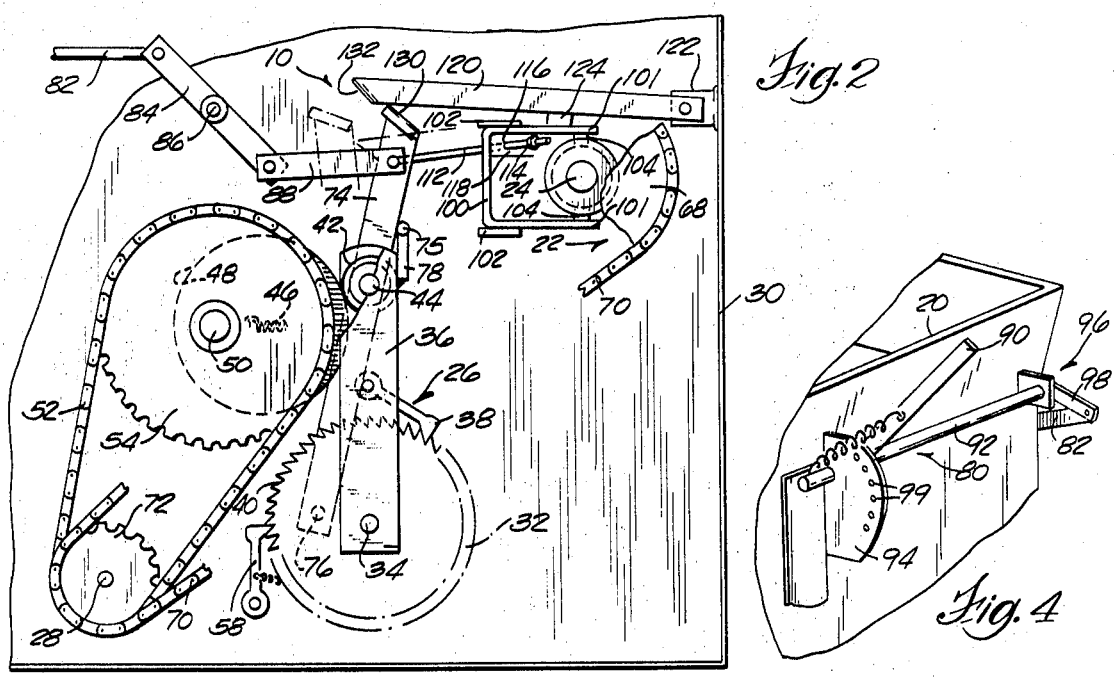
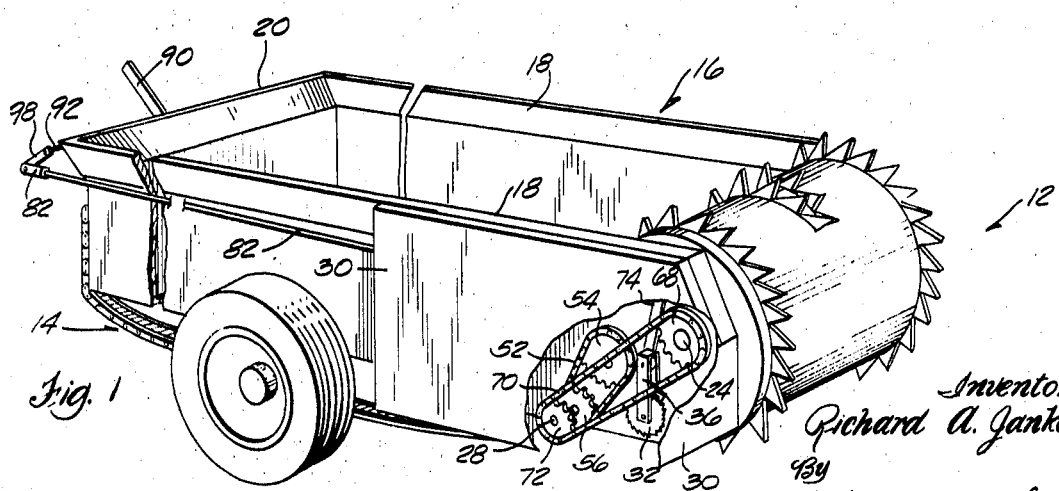
Inventor
Richard A. Jankowski
By
Wheler, Wheler, House & Clemency
Attorneys

DRIVE ARRANGEMENT

BACKGROUND OF THE INVENTION

Manure spreaders generally have a beater drum mounted at the rear of the spreader to distribute manure over a wide area behind the wagon as the manure is fed to the drum by a variable speed apron conveyor. Separate control assemblies have been used to control the speed of the conveyor and the operation of the beater drum.

SUMMARY OF THE INVENTION

The control assembly of this invention provides for the automatic engagement and disengagement of the clutch for a beater drum at predetermined speeds of operation for the apron conveyor in a manure spreader. The apron conveyor is conventionally driven in a step by step manner by a ratchet drive actuated by a continuously rotating eccentric cam. A selectively positionable control linkage is used to vary the speed of the apron conveyor by controlling the amount of drive imparted to the conveyor by the ratchet drive. The control linkage is connected to the clutch for the beater drum by a lost motion connection to disengage the clutch when the apron conveyor is operating a high speed. A kickout lever prevents reengagement of the clutch until the apron conveyor is stopped. The clutch is reengaged by using the movement of the control linkage to cam the kickout lever away from the clutch at the conveyor no-drive or stop position for the control linkage. The kickout lever may be manually moved away from the clutch to allow for the reengagement of the clutch at any speed of movement of the apron conveyor.

Other objects and advantages of the present invention will become apparent from the following detailed description when read in connection with the accompanying drawings in which:

FIG. 1 is a perspective view of a manure spreader in which the invention is used.

FIG. 2 is an enlarged view of the control assembly with the control linkage in the no-drive position.

FIG. 3 is a top view of the control assembly of FIG. 2.

FIG. 4 is a view of the manual control lever for the control linkage.

DESCRIPTION OF THE INVENTION

The control assembly 10 of this invention is used to coordinate the operation of a beater drum 12 with the speed of an apron conveyor 14 for a manure spreader 16 having sidewalls 18 and an end wall 20. The beater drum 12 is used to distribute manure over a wide area at the rear of the spreader and is driven by means of a clutch 22 provided at the end of a beater drum shaft 24. The apron conveyor 14 is used to carry manure to the beater drum 12 and is driven in a step by step manner by means of a ratchet drive 26. The clutch 22 and the ratchet drive 26 are driven off of a drive shaft 28 from a power source (not shown). The power source may be an independent motor or a drive connection to the power takeoff from a tractor connected to the front of the spreader 16. A housing 30 is provided on the sidewall 18 of the spreader 16 to enclose the clutch 22, the ratchet drive 26 and the drive shaft 28.

More specifically, the ratchet drive 26 includes a ratchet wheel 32 secured to an apron conveyor drive shaft 34 and having a number of peripheral teeth 40. The ratchet wheel 32 is driven by the reciprocating motion of a ratchet drive arm 36 pivotally mounted on the drive shaft 34 and having a pivotally mounted pawl 38 in position to engage the teeth 40 on the ratchet wheel 32. The drive arm 36 is also provided at the end thereof with a pin 44 rotatably carrying a cam roller 42. This roller 42 is biased toward an eccentric cam 48 by means of a spring 46 so that the cam roller 42 rides on the surface of the cam 48. The cam 48 is secured to a shaft 50 mounted on the sidewall 18 of the spreader 16 and is rotated continuously by means of a chain 52 which is mounted on a chain sprocket 54 secured to the shaft 50 and which is also mounted on a drive sprocket 56 on the drive shaft 28. When the drive arm 36 moves through a full cycle, the pawl 38 will move across a given number of the teeth 40 on the ratchet wheel 32 producing relatively high speed movement of the apron conveyor 14. The ratchet wheel 32 is prevented from backing up on the forward motion of the drive arm 36 by means of a backup pawl 58.

The clutch 22 has a splined spool 60 mounted for axial motion on a splined section 62 of the drum drive shaft 24 with a spring 64 provided on the shaft 24 to bias the spool 60 into engagement with a hub 66 mounted for rotation on the end of shaft 24 and supporting a chain sprocket 68. The chain sprocket 68 is connected to the drive shaft 28 by a chain 70 mounted on the chain sprocket 68 and on a second drive sprocket 72 on the drive shaft 28. The clutch 22 is disengaged by moving the spool 60 axially along the shaft 24 away from the hub 66 against the bias of the spring 64.

In accordance with the invention, the control assembly 10 includes means for regulating the speed of the apron conveyor 14. Such regulation is provided by limiting the motion of the drive arm 36. Said regulation means is in the form of a ratchet stop lever 74 pivotally mounted on a hub 76 provided on the sidewall 18 of the spreader 16 next to the drive arm 36. Selectively positionable means are provided on the drive arm 36 for selectively limiting stop lever motion by engaging the stop lever 74. Such means is in the form of a stop pin 75 secured to a plate 78 on the drive arm 36. The position of the stop lever 74 will determine the amount of motion of the drive arm 36 and as a consequence the number of teeth 40 passed over by the pawl 38 in each stroke of the drive arm 36.

In order to selectively limit the throw of the drive arm, means are provided for selectively positioning the stop lever 74 relative to the drive arm 36. This means includes, at the front of the wagon (see FIG. 4), a manually actuated lever assembly 80 connected to the stop lever 74 by a connecting rod 82, a pivot link 84 which rocks about a pivot pin 86 and a connecting link 88 attached to the stop lever 74. The lever assembly 80 includes a manually actuated handle 90 fixed to a pivot rod 92 mounted in an index plate 94 and a spaced bracket 96 secured to the front end wall 20. Rotary motion of the rod 92 is transferred to the connecting rod 82 by means of a radial arm 98 connected to the connecting rod 82 and to the pivot rod 92. Various speed settings for the apron conveyor 14 are indicated by apertures 99 provided in the index plate 94. The handle 90 is positively located at the various speed settings by locating a set pin (not shown) provided on the handle 90 in one of the apertures 99. The end position of the handle 90 is a no-drive speed setting where the drive arm 36 is prevented from moving by the stop lever 74. The other positions provide increasing amounts of motion of the drive arm 36 by allowing the pawl 38 to pass over additional teeth 40 during each oscillation of the ratchet drive arm 36.

In order to stop the beater drum when the stop lever 74 is moved to the high speed drive setting or full motion position for the drive arm 36, means connected to the stop lever 74 are provided for disengaging the clutch 22. This means includes a U-bracket 100 having legs 101 with the bracket being pivotally mounted on spaced support plates 102 secured to the sidewall 18 of the spreader 16. The legs 101 of the U-bracket 100 are positioned on diametrically opposite sides of a groove 108 provided in the spool 60. The pivotal motion of the U-bracket 100 is transferred to the spool 60 by means of a pair of axially aligned rollers 104 mounted on the inside surfaces of the legs 101 in alignment with the groove 108. The U-bracket 100 is pivoted on the support plates 102 by means of a lever arm 110 secured at 115 to the U-bracket 100 and connected to the ratchet stop lever 74 by a clutch control rod 112. Pivotal movement of the U-bracket 100 will move the spool 60 away from the hub 66 against the bias of the spring 64.

The apron conveyor 14 is allowed to operate while the clutch 22 is disengaged by means of a lost motion connection provided between the clutch control rod 112 and the lever arm 110. The means includes a nut 114 provided on the end of the clutch control rod 112 which projects through and is free to move in an aperture 116 provided in a flange 118 on the lever arm 110. When the handle 90 is moved to the high speed position for the apron conveyor 14, the nut 114 will engage the flange 118 pulling the lever arm 110 with the stop lever 74 to disengage the clutch 22.

In order to prevent reengagement of the clutch 22 while the apron conveyor is operating, means are provided to engage the lever arm 110 in the form of a kickout lever 120 pivotally mounted on a plate 122 secured to the housing 30. The kickout lever 120 is provided with a depending tab 124 which normally rides on the top of the lever arm 110. When the lever arm 110 is moved from under the tab 124, the kickout lever 120 will be free to drop due to its own weight onto the top support bracket 102 with the tab 124 in position to engage and block the return motion of the lever arm 110. The apron conveyor 14 can then be operated independently of the beater drum 12 when the clutch 22 is locked in the disengaged position due to the lost motion provided between the clutch control rod 112 and the lever arm 110.

In order to release the tab 124 on the kickout lever from engagement with the lever arm 110 at the no-drive speed position of the stop lever 74, means are provided on the ratchet stop lever 74 for camming the kickout lever 120 away from the support bracket 102. This means includes, at the end of the stop lever 74, a flange 130 which is positioned to engage an angular cam surface 132 provided at the end of the kickout lever 120. The kickout lever 120 will be pushed upward by the camming action of the flange 130 until the tab 124 clears the lever arm 110. The spool 60 will then be free to move into engagement with the hub 66 of the chain sprocket 68 by the bias of spring 64. The clutch 22 can be reengaged at any time by manually lifting the kickout lever 120 to move the tab 124 out of the path of motion of the lever arm 110.

This control assembly provides for the automatic disengagement of the beater drum clutch whenever the conveyor is operated at high speed and for the automatic reengagement of the beater drum clutch whenever the apron conveyor is stopped. This allows the apron conveyor to be operated at any of the intermediate speeds regardless of the operative condition of the beater drum. Overload of the beater drum is prevented by reengaging the beater drum clutch only at the no speed drive setting of the conveyor.

Various of the features of the invention are set forth in the following claims.

I claim:

1. A manure spreader including a frame, a beater drum rotatably mounted on said frame, an apron conveyor movably mounted on said frame, means on said frame for driving said beater drum including a clutch, means on said frame for driving and regulating the speed of said apron conveyor between low speed and high speed and including a step by step ratchet drive having a drive arm, and a ratchet stop lever positioned to control the motion of said drive arm, means connected to said apron conveyor drive and speed regulating means and to said clutch for disengaging said beater drum clutch when said apron conveyor is driven at high speed, an element mounted on said frame and movable relative to a position preventing reengagement of said clutch, and means on said ratchet stop lever engageable with said element for camming said element from said position in response to operation of said apron conveyor drive and speed regulating means to effect low speed apron conveyor operation.

2. A manure spreader in accordance with claim 1 wherein said clutch disengaging means includes a lost motion connection between said clutch and said apron conveyor drive and speed regulating means.

3. A manure spreader in accordance with claim 1 including a handle assembly mounted on said frame and operably connected to said stop lever.

4. A manure spreader in accordance with claim 1 wherein said clutch is biased into driving engagement and said clutch disengaging means includes a movable part having a first portion and a second portion operably engaged with said clutch to effect disengagement of said clutch against the action of said biasing means, said clutch disengaging means also including a link connecting said stop lever and said first portion of said movable part.

5. A manure spreader in accordance with claim 4 including a lost motion connection between said first portion of said movable part and said link.

6. A manure spreader in accordance with claim 4, wherein said element includes a tab located to prevent movement of said movable part toward a position permitting engagement of said clutch by said biasing means when said stop lever is operative to effect low speed apron conveyor operation.

7. The combination in a manure spreader of a frame, a beater drum rotatably mounted on said frame, an apron conveyor movably mounted on said frame, means on said frame for driving said beater drum including a clutch, a drive arm operably connected to said apron conveyor and mounted on said frame for movement to effect apron conveyor movement, a member mounted on said frame for movement between high and low speed positions and operably connected to said drive arm to control the motion of said drive arm, a linkage operably connected between said member and said clutch for disengaging said clutch when said member is in said high speed position, an element mounted on said frame for movement relative to a position preventing reengagement of said clutch, and means on said member engageable with said element for moving said element from said position preventing clutch reengagement in response to movement of said member to said low speed position.

8. A manure spreader in accordance with claim 7, wherein said linkage includes a lost motion connection between said clutch and said member.

9. A manure spreader in accordance with claim 7, including a handle assembly mounted on said frame and operably connected to said member.

10. A manure spreader in accordance with claim 7, wherein said clutch is biased into driving engagement and said linkage includes a movable part having a first portion and a second portion operably engaged with said clutch to effect disengagement of said clutch against the action of said biasing means, said linkage also including a link connecting said member and said first portion of said movable part.

11. A manure spreader in accordance with claim 10 including a lost motion connection between said first portion of said movable part and said link.

12. A manure spreader in accordance with claim 10, wherein said element includes a tab located to prevent movement of said movable part toward a position permitting engagement of said clutch by said biasing means when said member is operative to effect low speed apron conveyor operation.

13. The combination in a manure spreader of a frame, a beater drum rotatably mounted on said frame, an apron conveyor movably mounted on said frame, means on said frame for driving said beater drum including a clutch, a drive arm operably connected to said apron conveyor and pivotally mounted on said frame for movement to effect apron conveyor movement, a first lever pivotally mounted on said frame for movement between high and low speed positions and operably connected to said drive arm to control the motion of said drive arm, a link operably connected between said first lever and said clutch for disengaging said clutch when said first lever is in said high speed position, a second lever pivotally mounted on said frame for movement relative to a position preventing reengagement of said clutch, and a cam on said first lever engageable with said second lever for camming said second lever from said position preventing clutch reengagement in response to movement of said first lever to said low speed position.

75